(12) United States Patent
Scharfe et al.

(10) Patent No.: US 8,397,124 B2
(45) Date of Patent: Mar. 12, 2013

(54) MEMORY SYSTEM, SENSE AMPLIFIER, USE, AND METHOD FOR ERROR DETECTION BY MEANS OF PARITY BITS OF A BLOCK CODE

(75) Inventors: Andre Scharfe, Bannewitz (DE); Dieter Ansel, Heilbronn (DE); Ingo Ruhm, Vierkirchen (DE)

(73) Assignee: Atmel Corporation, San Jose, CA (US)

( * ) Notice: Subject to any disclaimer, the term of this patent is extended or adjusted under 35 U.S.C. 154(b) by 866 days.

(21) Appl. No.: 12/508,186

(22) Filed: Jul. 23, 2009

(65) Prior Publication Data

US 2010/0023841 A1 Jan. 28, 2010

Related U.S. Application Data

(60) Provisional application No. 61/083,280, filed on Jul. 24, 2008.

(30) Foreign Application Priority Data

Jul. 24, 2008 (DE) .......................... 10 2008 034 837

(51) Int. Cl.
*H03M 13/00* (2006.01)
(52) U.S. Cl. ........................................ 714/758; 714/763
(58) Field of Classification Search .......................... None
See application file for complete search history.

(56) References Cited

U.S. PATENT DOCUMENTS

| 4,453,251 | A | | 6/1984 | Osman | |
|---|---|---|---|---|---|
| 5,425,038 | A | * | 6/1995 | Chen | 714/755 |
| 5,559,813 | A | * | 9/1996 | Shimizu | 714/755 |
| 6,199,139 | B1 | * | 3/2001 | Katayama et al. | 711/106 |
| 6,275,960 | B1 | | 8/2001 | Cappelletti et al. | |
| 6,564,352 | B1 | * | 5/2003 | Furuhashi et al. | 714/801 |
| 6,678,860 | B1 | * | 1/2004 | Lee | 714/763 |
| 2005/0286339 | A1 | * | 12/2005 | Parris et al. | 365/236 |
| 2007/0089035 | A1 | * | 4/2007 | Alexander et al. | 714/766 |
| 2008/0215953 | A1 | * | 9/2008 | Deierling et al. | 714/759 |
| 2009/0276680 | A1 | * | 11/2009 | Chiu | 714/752 |

FOREIGN PATENT DOCUMENTS

EP 0 926 687 A1 6/1999

* cited by examiner

*Primary Examiner* — Gabriel Chu
(74) *Attorney, Agent, or Firm* — Baker Botts LLP

(57) ABSTRACT

A memory device for an error-correcting block code is provided, whereby each code word of the block code can have data bits and parity bits. The device also includes a memory for storing the data bits and the parity bits of each code word, and includes an error detection circuit, which is formed to detect an error of the data bits in a code word by evaluating exactly one subset of the stored parity bits of the code word. The subset being smaller than the total number of parity bits of the code word.

20 Claims, 4 Drawing Sheets

MEMORY SYSTEM, SENSE AMPLIFIER, USE, AND METHOD FOR ERROR DETECTION BY MEANS OF PARITY BITS OF A BLOCK CODE

This nonprovisional application claims priority to German Patent Application No. 10 2008 034 837, which was filed in Germany on Jul. 24, 2008, and to U.S. Provisional Application No. 61/083,280, which was filed on Jul. 24, 2008, and which are both herein incorporated by reference.

BACKGROUND OF THE INVENTION

1. Field of the Invention

The present invention relates to a memory system, a sense amplifier, a use, and a method for error detection via parity bits of a block code.

2. Description of the Background Art

U.S. Pat. No. 4,453,251 discloses a memory with an error correction. An option for error correction is the use of a block code. The Hamming code is a prior-art block code used for memories. The Hamming code encodes data and stores these as code words in a memory. Each individual code word has data bits and a plurality of parity bits (check bits). When the code words are read, the Hamming code is checked to determine whether it is a valid code. In the case of error, the bit in error in the code word is corrected by means of the Hamming error correction procedure. According to U.S. Pat. No. 4,453,251, the Hamming approach is unattractive, because the memory capacity must be substantially increased in order to accommodate the data bits and the parity bits of each code word. Alternatively, U.S. Pat. No. 4,453,251 proposes a memory array with lines and columns each with a parity bit for each column and a parity bit for each line.

European Pat. No. EP 0 926 687 A1, which corresponds to U.S. Pat. No. 6,275,960, provides a method for self-test and correction of errors. In the method for error correction, the lines (rows) for all columns must be read out. The rows are read out in their sequence, starting with row 0, and the single parity bit of the row is verified. In the case of error, the corresponding row is marked by a flag and a procedure to check the column parity is started.

SUMMARY OF THE INVENTION

It is therefore an object of the present invention to provide a memory device. The memory device can also be called a memory system. The memory can be a nonvolatile memory, such as, for example, a flash memory, an FRAM memory, or EEPROM memory.

The memory device can be formed for an error-correcting block code. Each code word of the block code can have data bits and parity bits. The memory device can be formed to store the data bits and the parity bits of the code word of the block code in the memory. The data bits in this case may contain program code for a program sequence or values, such as, for example, measured values or control values. The parity bits can also be called parity bits or check bits. The parity bits of the code word are used to detect errors of data bits in the same code word. Detected errors can then be corrected by means of the block code. Preferably, an error-correcting block code, such as, for example, a Hamming code, is used.

The memory device can have an error detection circuit, which is formed to detect in a code word an error in the data bits of the code word by evaluating exactly one subset of the parity bits of the code word stored in the memory. Check equations, assigned to the parity bits of the subset in the code word, are used for detection. The subset of the parity bits of the code word is smaller than the total number of parity bits of the code word in the block code. For example, the code word has a total number of five parity bits. The subset in this example has a maximum of four but preferably only two parity bits.

In an embodiment, a sense amplifier of a memory device is provided. The sense amplifier can be connected with a memory array of the memory device.

The sense amplifier can have a transistor, which for charging a capacitance of a bit line can be connected to the bit line. The capacitance of the bit line is generally produced by parasitic capacitances, for example, a plurality of connected transistors. The transistor is preferably a field-effect transistor, for example, a P-MOSFET.

Furthermore, the sense amplifier can have an output unit which is connected to the bit line. The output unit outputs the bit value, stored in a memory cell of the bit line, at its output. The output unit preferably has a volatile memory element, such as a latch or a flip-flop for temporary storage, which is connected to the output of the sense amplifier.

The sense amplifier can have a switchable current source, which is connectable in parallel to the transistor. The switchable current source has a control terminal for turning a current of the current source on and off. The switchable current source in this case is also connected to the bit line.

In another embodiment, a method for error detection is provided for error detection via parity bits of a block code. Each code word of the block code can have a plurality of data bits and a plurality of parity bits.

Exactly one subset of the parity bits of one and the same code word can be read out from a memory in the method. The rest of the parity bits of the code word, which are not contained in the subset, in contrast are initially not read out.

Check equations of the read-out parity bits of the subset are calculated for error detection. For example, the particular parity bit of the code word and the associated data bits of the code word are XORed in a check equation.

After an error of a data bit is detected by the calculation using the check equations, the rest of the parity bits of the total number of parity bits of the code word are then read out from the memory. If in contrast no error is detected, the rest of the parity bits of the code word, not contained in this subset, are not read out and the process sequence is continued until, for example, an error is detected later.

After an error is detected and the rest of the parity bits, not present in the subset, of the code word are read out, the check equations of the rest of the read-out parity bits of the code word are calculated. In addition, the data bit error is corrected within the scope of decoding.

A use of parity bits of a code word of a block code is also provided. Accordingly, the use of exactly one subset from a larger total number of parity bits of the same code word of a block code is provided for detecting a data bit in error in the code word. The detection occurs preferably in a sleep mode. The block code is preferably an error-correcting block code.

The sleep mode, in contrast to an operating mode, has a reduced clock frequency particularly for reading out the data bits or parity bits of the code word.

The total number of the parity bits of the code word is evaluated if and only if a data bit in error has been previously detected.

The examples described hereinafter refer to the memory device, as well as to the sense amplifier, the use, and the method. For example, functionalities of the memory device and the sense amplifier emerge from the method features.

In an embodiment, the data bits and the parity bits of the code word can be stored in a line of the memory. The memory is formed for the parallel reading out of the data bits and the parity bits of the line. In this case, the parity bits of the subset and the rest of the parity bits of the same code word are stored in the same line. This makes it possible to read out all parity bits of a code word in real time from the memory, without needing to interrupt the program sequence of a connected arithmetic logic unit. Furthermore, the lines and columns of the memory may be arranged as a memory array. Columns of the memory array, in contrast, cannot be read out in parallel.

According to another embodiment, the error detection circuit can be formed, in the case of data bit error detection, to activate a reading out of the rest of the parity bits, not contained in the subset, of the code word. The activation in this case occurs for the current datum with the current data bits of the code word. The activation can also be continued for a subsequent datum with new data bits and parity bits. Preferably, the error detection circuit has separate control outputs for the current datum (and optionally also for a subsequent datum) to read out the rest of the parity bits, not contained in the subset, of the code word.

In yet another embodiment, the error detection circuit can be connected to a sense amplifier and is formed to control the sense amplifier by means of a control signal for activating the reading out. For this purpose, the sense amplifier can have control inputs, by means of which it is possible to control a reading or non-reading of the particular bit line.

The error detection circuit can have a memory element for storing the activation. This type of memory element can be, for example, a latch or a flip-flop whose output is connected to a control input of the error detection circuit.

According to an embodiment, the error detection circuit can be connected to an arithmetic logic unit. The arithmetic logic unit can be, for example, a computing core of a microcontroller. The error detection circuit is preferably formed to delete the storage of the activation by a control signal, for example, a flag, of the arithmetic logic unit.

According to an embodiment, the sense amplifier can have a logic unit whose output is connectable to the control input of the transistor. Two input values are linked logically to two inputs of the logic unit by the logic unit. For example, a logic unit as a logic link links the input values by a logical AND or logical OR operation.

The switchable current source and the transistor of the sense amplifier can be connected to the bit line, which is assigned a parity bit of the code word of the block code. The parity bit of the code word is not contained in the subset. In each case, a current source can be connected to a bit line of each parity bit of the code word, which is not contained in the subset, so that the bit line can be supplied with a constant current, limited by the current source, also after triggering of the word line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a generator matrix of a block code,
FIG. 5 is a generator matrix with code shortening.

DETAILED DESCRIPTION

Figure 1:
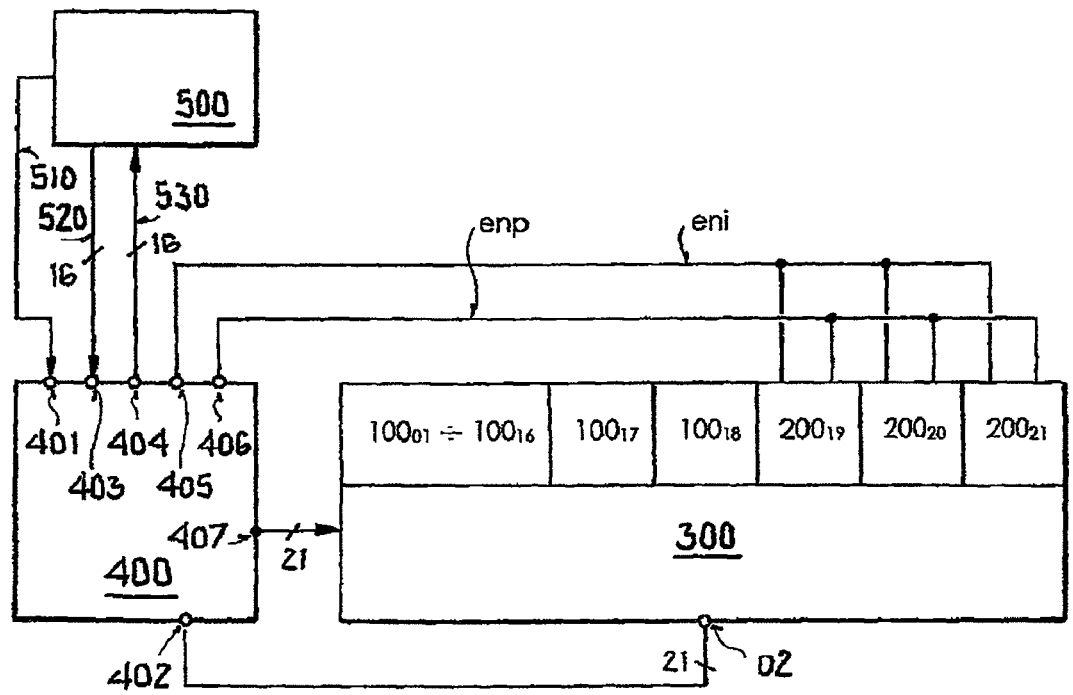
FIG. 1 is a schematic drawing of a memory system.

A memory device is shown schematically in FIG. 1 by a block diagram. Shown is a memory array 300 having sense amplifiers $100_{10}$ to $100_{16}$, which are connected to bit lines of data bits, and having sense amplifiers $100_{17}$, $100_{18}$, $200_{19}$, $200_{20}$, $200_{21}$, which are connected to bit lines of parity bits of a block code. The stored information in memory array 300 is read out by means of the bit lines and word lines (neither is shown) by addressing (also not shown). The triggering of the array for reading out the stored information is known per se and omitted in FIG. 1 for the sake of better clarity.

Furthermore, an error detection circuit 400 and an arithmetic logic unit 500, for example, a computing core of a microcontroller, are shown in FIG. 1. The memory system shown in FIG. 1 is formed to store data bits and parity bits of an error-correcting block code, said bits combined into a code word, in memory 300. A usable block code is, for example, a 31-bit Hamming code. For storage, data bits are transferred, for example, via connection 520 from arithmetic logic unit 500 to an input 403 of error detection circuit 400. Error detection circuit 400 is formed for coding by means of the block code. Data bits and parity bits of each code word of the block code are recorded via output 407 of error detection circuit 400 in memory array 300.

Error detection circuit 400 is formed to detect an error of the data bits by evaluating exactly one subset of the stored parity bits of a code word, the subset being smaller than the total number of the parity bits of the code word. To read out the data bits and parity bits of the code word, memory array 300 is connected via an output 02 to error detection circuit 400.

To reduce the reading out of the parity bits corresponding to the subset of the code word, error detection circuit 400 has a first control output 406 to output a first control signal enp and a second control output 405 to output a second control signal eni. First control output 406 and second control output 405 are connected to sense amplifiers $200_{19}$, $200_{20}$, $200_{21}$. Said sense amplifiers $200_{19}$, $200_{20}$, $200_{21}$ are connected to bit lines (not shown) for parity bits, which are not contained in the subset. Sense amplifiers $100_{17}$, $100_{18}$, which are connected to bit lines for the parity bits of the subset, in contrast, are not connected to control outputs 405, 406 of error detection circuit 400, so that the parity bits of the subset can be output in any desired addressing via output 02.

Error detection circuit 400 is formed, in the case of error detection, to activate a reading out of the rest of the parity bits, not contained in the subset, of the code word. To this end, the control signal eni is changed at second control output 405, so that asynchronously to a clock immediately after error detection by error detection circuit 400, sense amplifiers $200_{19}$, $200_{20}$, $200_{21}$ for the parity bits not contained in the subset are triggered to output the parity bits. The data bits and the parity bits of the code word in this case are stored in a line of memory array 300 of the memory. A line is activated by triggering, so that all data bits and parity bits of the activated line can be read out in parallel. Bits in columns (not shown) of memory array 300, in contrast, cannot be read out in parallel. To read out the data, the columns are triggered one after another.

By means of the first control signal enp, outputtable via first control output 406, the output of the parity bits not contained in the subset can be activated permanently, i.e., for the subsequent data (for example, other columns). For this purpose, error detection circuit 400 advantageously has a memory element in the form of a flip-flop to store the activation. If, for example, the flip-flop is set, sense amplifiers $200_{19}$, $200_{20}$, $200_{21}$ for the parity bits, not contained in the subset, behave as sense amplifiers $100_{17}$, $100_{18}$ of parity bits contained in the subset.

Control input 401 of error detection circuit 400 is connected via a control line 510 to arithmetic logic unit 500. By means of control line 510 and a program sequence, arithmetic logic unit 500 is enabled to store the activation and/or deletion of the storage of the activation by a control signal.

Furthermore, error detection circuit 400 is formed to correct data bits in error in a code word by means of the block code. Correct or corrected data bits are transmitted via output 404 of error detection circuit 400 and connection 530 to arithmetic logic unit 500.

Figure 2:
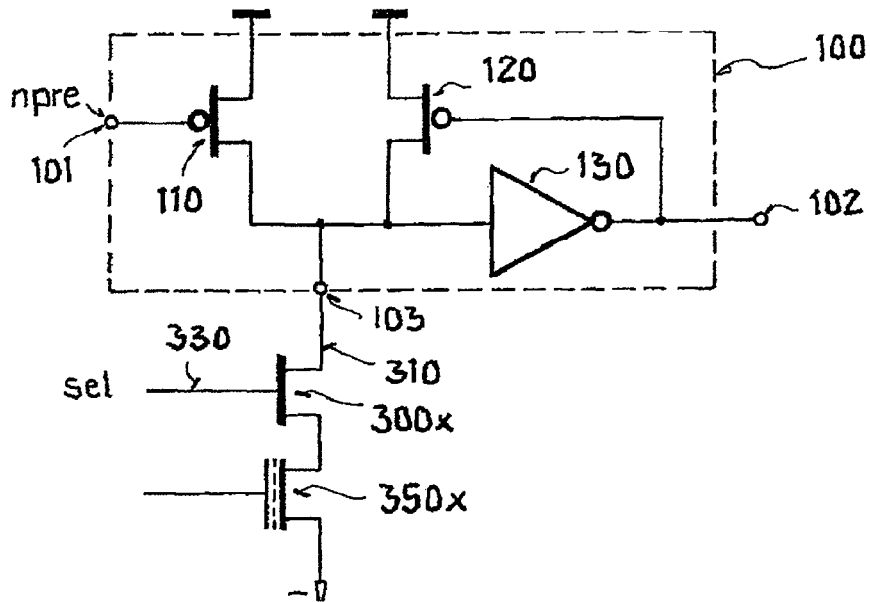
FIG. 2 is a circuit of a sense amplifier.

A sense amplifier 100, a selection transistor 300x connected to word line 330, and a memory cell 350x are shown schematically in a subcircuit diagram in FIG. 2. The triggering of selection transistor 300x, connected to word line 330, occurs via the control signal sel determined from the addressing. Sense amplifier 100 has a transistor (PMOS) 110 for precharging bit line 310 connected to terminal 103 of sense amplifier 100. Transistor 110 is controlled directly by a control signal npre of an addressing.

Furthermore, a latch is provided, having another transistor (PMOS) 120 and an inverter 130. An output of the latch is connected to output 102 of sense amplifier 100. The input of the latch is connected via terminal 103 also to bit line 310. Sense amplifier 100 can be used advantageously for sense amplifiers $100_{10}$ to $100_{16}$, $100_{17}$, $100_{18}$, in the exemplary embodiment of FIG. 1.

Figure 3:
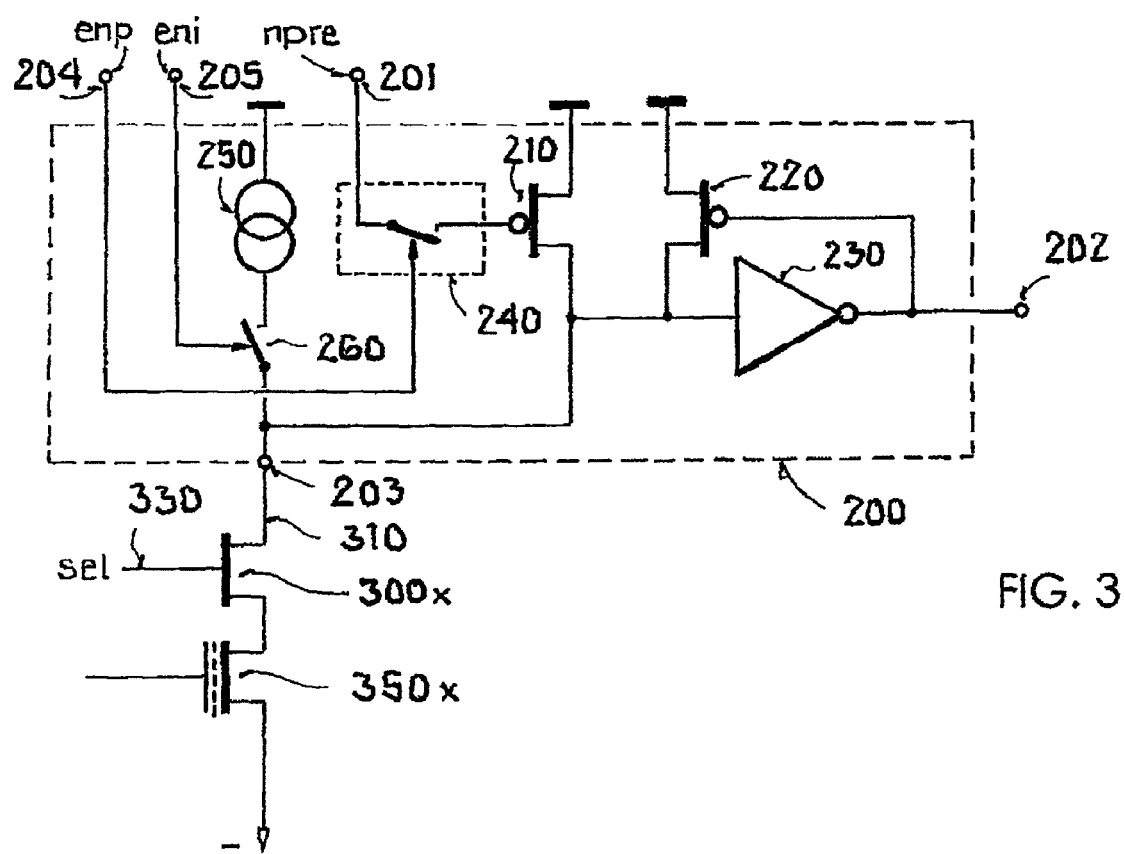
FIG. 3 is another circuit of a sense amplifier.

A sense amplifier 200 with an output 202 for the parity bits, not contained in the subset, in the code word is shown as a schematic circuit in FIG. 3. Sense amplifier 200 of the exemplary embodiment of FIG. 3 also has a transistor (PMOS) 210 for precharging bit line 310 connected to terminal 203 of sense amplifier 200. Transistor 210 is controlled via a logical link 240 by the control signal npre of the addressing.

A latch is also provided, having another transistor (PMOS) 220 and an inverter 230. The output of the latch is connected to output 202 of sense amplifier 200. The input of the latch is connected via terminal 203 also to bit line 310.

In addition, sense amplifier 200 has a switchable current source 250, 260, which in the exemplary embodiment of FIG. 3 is formed by a constant current source 250 and a switch unit 260. Switchable current source 250, 260 is connected to a control input 205 of sense amplifier 200, to which the control signal eni can be applied. Switchable current source 250, 260 is also connected to output 203 of sense amplifier 200 and therefore connected parallel to transistor 210.

An input of the logical link 240 is connected to a control input 204 for the control signal enp. The logical link is thereby formed in such a way that depending on the control signal enp, the control signal npre reaches the control terminal of transistor 210. In the exemplary embodiment of FIG. 4, the logical link is formed as a switch. Alternatively, an AND gate, NAND gate, OR gate, or NOR gate may be used as the logical link.

Sense amplifier 200 can be used advantageously for sense amplifiers $200_{19}$, $200_{20}$, and $200_{21}$ in the exemplary embodiment of FIG. 1.

An example of a block code is a Hamming code. A code word N of a 31-bit Hamming code can be represented as:
N=d1|d2|d3|d4|d5|d6|d7|d8|d9|d10|d11|d12|d13|
d14|d15|d16|d17|d18|d19|d20|d21|d22|d23|d24|
d25|d26|p1|p2|p3|p4|p5

In this case, d1 to d26 are the data bits of the code word N and p1 to p5 the parity bits of the code word N.

Figures 4, 5:
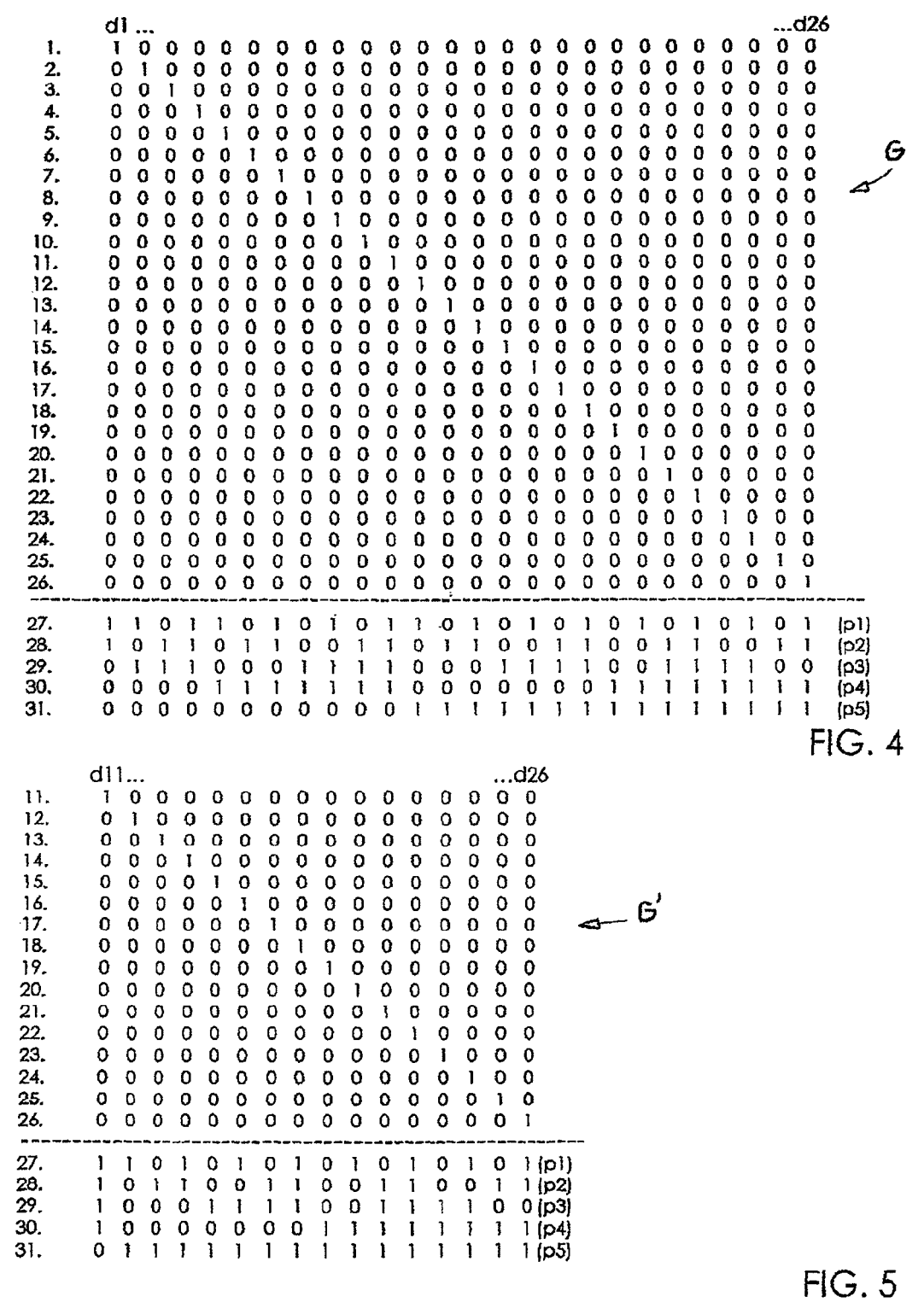

FIG. 4 shows a generator matrix G of a 31-bit Hamming code. This error-correcting block code has 26 data bits (n) d1 to d26, which is also called a data word, and 5 parity bits (k) p1 to p5, which are also called check digits or check bits. The total length of the code word is 31 bits.

A generator matrix G', derived from the generator matrix G of FIG. 4, is shown in FIG. 5. In the exemplary embodiment of FIG. 5, a code shortening was performed, so that only the data bits d11 to d26 are checked and the data bits d1 to d10 are set to a fixed value (zero or one). Therefore 16 data bits d11 to d26 remain; in this case, the bit width of the data bits d11 to d26 corresponds to a command bus width of an arithmetic logic unit, particularly a computing core (of a microcontroller, of a CPU), so that the generator matrix G' is reduced accordingly. It is evident that for the check equation for the fifth parity bit p5, only the data bits d12 to d26 of the code word N are evaluated, so that the following must apply by XORing:

p5⊗d12⊗d13⊗d14⊗d15⊗d16⊗d17⊗d18⊗d19⊗
d20⊗d21⊗d22⊗d23⊗d24⊗d25⊗d26=0

However, a second parity bit of the code word N must be evaluated in addition to be able to determine for all bits whether there is an error. If, for example, the check equation for p4 is used, the following applies:

p4⊗d11⊗d19⊗d20⊗d21⊗d22⊗d23⊗d24⊗d25⊗
d26=0

Alternatively, as is evident from FIG. 5, the check equations of parity bits p1, p2, or p3 may be used instead of p4. If, contrary to the exemplary embodiment of FIG. 5, only the data bits d12 to d26 (15 bits) are needed, an evaluation of check equation p5 is sufficient to detect an error.

In the exemplary embodiment of FIG. 5, therefore, only the 16 data bits d11 to d26 of the code word N and a subset of parity bits p4 and p5 of the total quantity of the parity bits (p1 to p5) of the code word N, therefore 18 bits overall of the total number of 21 bits of the code word N, which corresponds to a datum, are read out of the memory. During the first reading of a datum with parity information from the memory, therefore, not all parity bits are read out to save current but nevertheless to be able to detect bit errors.

If both equations are fulfilled, the datum with complete parity, therefore with all five parity bits p1 to p5, need not be determined. Solely in the case of error, in addition to the subset, the rest of the parity bits of the code word, therefore in the exemplary embodiment of FIG. 5 the rest of the parity bits p1, p2, and p3 of the code word, must be read out of the memory to correct a data bit in error. To this end, the rest of the parity bits p1, p2, and p3 can be read out later, for example, asynchronously to a clock, or alternatively all parity bits p1 to p5, therefore the parity bits p4 and p5 of the subset, are again read out.

In flash memories or EEPROM memories, the error case of a data bit in error is very rare. However, by means of the exemplary embodiment of FIG. 5, the surprising effect is achieved that 3 bits of 21 bits (apart from the very rare case of error) are not read out. If the same frequency for zeros and ones is assumed, on average 3 bit lines, the three parity bits p1, p2, and p3 outside the subset, must receive less current, so that a saving of current of about 14.3% is achieved. Nevertheless, in the case of error, all parity bits p1 to p5 are available for decoding and therefore for correction of the data bit in error. Furthermore, the reading of data is not carried out more slowly by this approach, because the arithmetic logic unit is not affected by the error correction. The error correction is carried out in a self-sustaining manner by the memory device without intervention in the program structure of the arithmetic logic unit. Because of the asynchronous error correction, this can occur asynchronously to a clock of the arithmetic logic unit yet between two clocks of the arithmetic logic unit. At a very high clock of the arithmetic logic unit, for this purpose the clock of the arithmetic logic unit can be stopped briefly.

Figure 6:
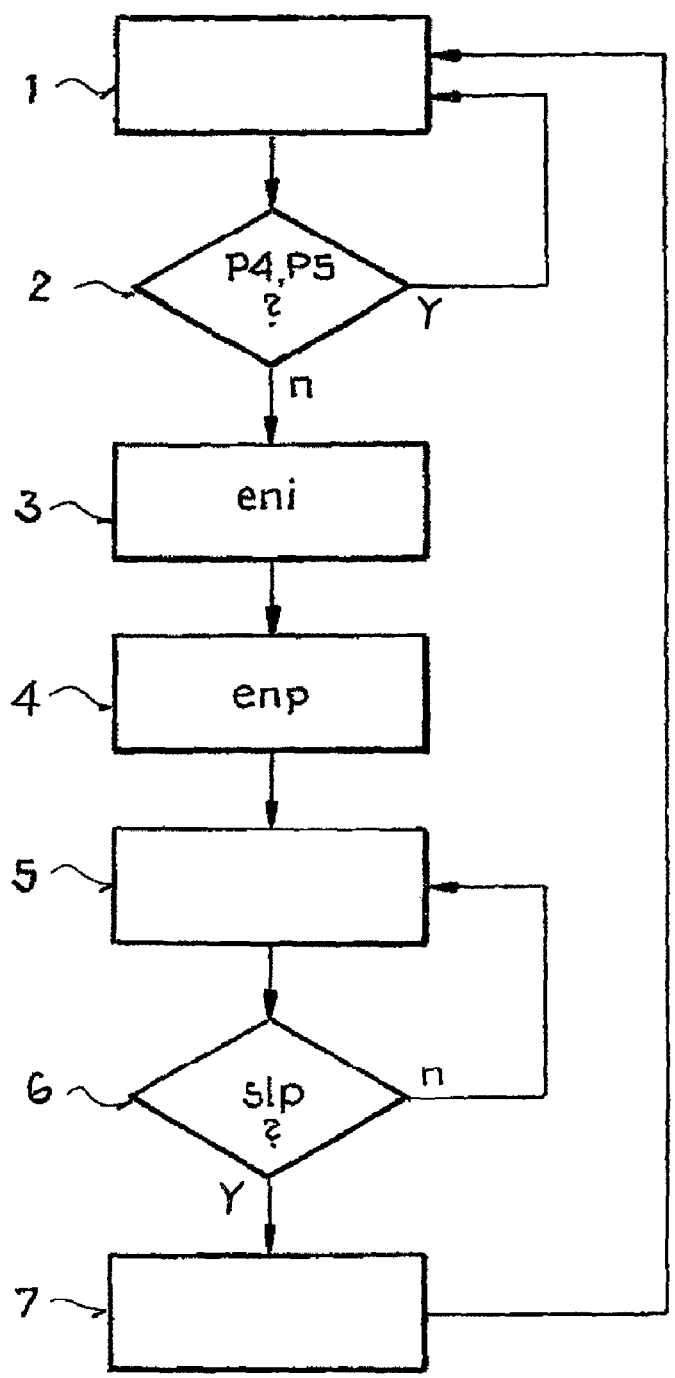
FIG. 6 is a schematic flowchart of a method.

A schematic flowchart of a method is shown in FIG. 6. In a first step 1, a sleep mode with a reduced clock frequency, compared with a normal operating mode, is controlled by an arithmetic logic unit. Further, in step 1 error detection is started by means of a subset of parity bits of a code word of a block code, for example, a Hamming code.

In the next step 2, parity bits p4 and p5 of the subset of the code word are read out from a memory with the reduced clock frequency. Further, in step 2 check equations of the read-out parity bits p4, p5 of the subset are calculated for error detection. If there is no error, the procedure is continued in step 1. In this case, the sleep mode can be continued, so that the sequence again reaches step 2.

If an error is detected in step 2 by calculation of the check equations of the read-out parity bits p4, p5 of the code word, the control signal eni is output in step 3. The control signal eni has the effect that a sense amplifier supplies current to the bit lines for the rest of the parity bits p1, p2, p3 of the code word, not contained in the subset, and reads out these parity bits p1, p2, p3 for decoding. With the reading out of the parity bits p1 to p3 from the memory, check equations of the rest of the read-out parity bits p1 to p3 of the code word are calculated. The error of a data bit is corrected by means of decoding. The correction is possible by the Hamming code as the error-correcting block code.

Step 3 occurs preferably asynchronously to the clocking of the arithmetic logic unit. As a result, even before the next clock, due to the asynchronous decoding a corrected memory content is present at the arithmetic logic unit for the further program sequence.

With the next clock signal, the additional binary control signal enp is output in step 4. To this end, for example, a register value or flip-flop is set. With the output of the additional control signal enp, the reading out of the parity bits p4, p5 of the subset of the code word is ended and subsequently all parity bits p1 to p5 of the code word are read out. This can be advantageous, when the data bit in error is in a program loop that is continuously repeated. The error correction is thus continuously active.

In the next step 5, the program changes to the operating mode with an increased clock frequency compared with the sleep mode. For example, in step 5, it is possible to shift program parts that contain the data bit in error to another memory region.

If in step 6 the sleep mode sip is again controlled or determined, the program is continued in step 7. Otherwise, the operating mode is continued in step 5. In step 7, the control signals eni and enp are reset, so that after step 1, in step 2 only the parity bits p4 and p5 of the subset of the code word are again read out.

The invention is not limited to the shown embodiment variants in FIGS. 1 through 6. For example, it is possible to use a different Hamming code for greater bit widths. It is also possible to use a block code other than the Hamming code.

The functionality of the memory system according to FIG. 1 can be used especially advantageously for a battery-operated system and/or a transponder that is supplied with energy via a field.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A memory device for an error-correcting block code, each code word of the block code having data bits and parity bits, the memory device comprising:
    a memory configured to store the data bits and the parity bits of each code word; and
    an error detection circuit configured to detect in a code word an error of the data bits by evaluating exactly one subset of the stored parity bits of the code word, the subset being smaller than a total number of parity bits of the code word, and
    wherein the error detection circuit, in a case of data bit error detection, is configured to activate a reading out of a rest of the parity bits not contained in the subset of the code word.

2. The memory device according to claim 1, wherein the data bits and the parity bits of the code word are stored in a line of the memory, the memory configured for parallel reading out of the data bits and the parity bits of the line of the memory.

3. The memory device according to claim 1, further comprising a sense amplifier connectable to the error detection circuit.

4. The memory device according to claim 3, wherein the error detection circuit is configured to control the sense amplifier via a control signal for activating the reading out of the parity bits not contained in the subset of the code word.

5. The memory system according to claim 1, wherein the error detection circuit has a memory element for storing the activation.

6. The memory device according to claim 5, further comprising an arithmetic logic unit connectable to the error detection circuit.

7. The memory device according to claim 6, wherein the error detection circuit is configured to delete the activation stored in the memory element via a control signal of the arithmetic logic unit.

8. The memory device according to claim 1, further comprising a sense amplifier comprising:
    a transistor configured to charge a capacitance of a bit line, the transistor being connectable to the bit line;
    an output unit configured to output a stored bit value, the output unit being connectable to the bit line; and
    a switchable current source configured to be connectable in parallel to the transistor, the switchable current source having a control terminal for switching a current of the current source, the switchable current source being connectable to the bit line.

9. The memory device according to claim 8, further comprising a logic unit having an output connectable to a control input of the transistor, wherein two input values are linked logically to two inputs of the logic unit by the logic unit.

10. The memory device according to claim 9, wherein the two input values are linked by a logical AND or logical OR operation.

11. The memory device according to claim 8, wherein the switchable current source and the transistor are connectable to the bit line, which is assigned to a parity bit of a block code.

12. A method for error detection by a block code, each code word of the block code having data bits and parity bits, the method comprising:
   reading a subset of the parity bits of a code word from a memory;
   calculating check equations of the read-out parity bits of the subset for error detection; and
   detecting an error in a data bit;
   reading from the memory, after the error in the data bit is detected, the rest of the parity bits of the total number of the parity bits of the code word;
   calculating check equations of the rest of the read-out parity bits; and
   correcting the data bit error.

13. The method according to claim 12, further comprising reading the data bits and the parity bits in parallel from the memory.

14. The method according to claim 12, further comprising controlling a sense amplifier via a control signal for activating the reading of the rest of the parity bits not contained in the subset of the parity bits of the code word.

15. The method according to claim 12, further comprising storing an activation of the rest of the parity bits in a memory element of an error detection circuit.

16. The method according to claim 15, further comprising deleting, by an arithmetic logic unit, the activation of the rest of the parity bits stored in the memory element.

17. The method according to claim 12, further comprising:
   charging, by a transistor of a sense amplifier, a capacitance of a bit line;
   outputting, by an output unit of the sense amplifier, a stored bit value; and
   switching a current of a current source coupled to the bit line.

18. The method according to claim 17, further comprising providing a logic unit having an output coupled to a control input of the transistor, wherein two input values are linked logically to two inputs of the logic unit by the logic unit.

19. The method according to claim 18, wherein the two input values are linked by a logical AND or logical OR operation.

20. The method according to claim 17, further comprising assigning the bit line to the parity bit of the block code.

* * * * *